US007873253B2

(12) United States Patent
Smrha et al.

(10) Patent No.: US 7,873,253 B2
(45) Date of Patent: *Jan. 18, 2011

(54) ADAPTER PANEL WITH LATERAL SLIDING ADAPTER ARRAYS

(75) Inventors: Mark Smrha, Burnsville, MN (US); Hutch Coburn, Eden Prairie, MN (US); Chad J. Sjodin, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/460,162

(22) Filed: Jul. 13, 2009

(65) Prior Publication Data

US 2010/0111482 A1  May 6, 2010

Related U.S. Application Data

(63) Continuation of application No. 11/715,258, filed on Mar. 6, 2007, now Pat. No. 7,570,861, which is a continuation-in-part of application No. 11/655,760, filed on Jan. 19, 2007, now Pat. No. 7,570,860.

(51) Int. Cl.
*G02B 6/00* (2006.01)
(52) U.S. Cl. ....................... 385/135; 385/134
(58) Field of Classification Search .............. 385/134, 385/135
See application file for complete search history.

(56) References Cited

U.S. PATENT DOCUMENTS

| 4,765,710 | A  | 8/1988  | Burmeister et al. |
| 5,129,030 | A  | 7/1992  | Petrunia |
| 5,167,001 | A  | 11/1992 | Debortoli et al. |
| 5,497,444 | A  | 3/1996  | Wheeler |
| 5,717,810 | A  | 2/1998  | Wheeler |
| 5,758,003 | A  | 5/1998  | Wheeler et al. |
| 6,504,988 | B1 | 1/2003  | Trebesch et al. |
| 6,591,051 | B2 | 7/2003  | Solheid et al. |
| 6,715,619 | B2 | 4/2004  | Kim et al. |
| 6,760,531 | B1 | 7/2004  | Solheid et al. |
| 6,804,447 | B2 | 10/2004 | Smith et al. |
| 6,920,274 | B2 | 7/2005  | Rapp et al. |
| 6,937,807 | B2 | 8/2005  | Franklin et al. |

(Continued)

FOREIGN PATENT DOCUMENTS

EP          0 341 027 A2    11/1989

(Continued)

OTHER PUBLICATIONS

ADC Telecommunications *Fiber Outside Plant Systems*, 4 pgs.; Aug. 1998.

(Continued)

*Primary Examiner*—Jennifer Doan
(74) *Attorney, Agent, or Firm*—Merchant & Gould P.C.

(57) ABSTRACT

An adapter panel arrangement including a chassis and a panel of adapters. The adapters defining rearward cable connections and forward cable connections of the panel arrangement. Openings permitting access to the rearward and forward cable connections of the adapters are provided. The chassis further including a removable rear chassis portion to provide access to cable routing areas within the chassis interior.

19 Claims, 10 Drawing Sheets

U.S. PATENT DOCUMENTS

| | | |
|---|---|---|
| 6,944,383 B1 | 9/2005 | Herzog et al. |
| 7,194,181 B2 | 3/2007 | Holmberg et al. |
| 7,200,316 B2 | 4/2007 | Giraud et al. |
| 7,474,828 B2 | 1/2009 | Leon et al. |
| 7,570,860 B2 | 8/2009 | Smrha et al. |
| 7,570,861 B2 | 8/2009 | Smrha et al. |
| 2003/0174996 A1 | 9/2003 | Henschel et al. |
| 2003/0223723 A1 | 12/2003 | Massey et al. |
| 2004/0086252 A1 | 5/2004 | Smith et al. |

FOREIGN PATENT DOCUMENTS

| | | |
|---|---|---|
| EP | 1 603 345 A2 | 12/2005 |

OTHER PUBLICATIONS

ADC Telecommunications *Fiber Panel Products*, Second Edition, 6 pgs.; Jul. 1996.

Corning Cable Systems; "Jumper Routing Procedure for Enhanced Management Frame"; Issue 2; dated Apr. 2002; 4 pgs.

Drawing of ADC Telecommunications Drawer, 1 page; Aug. 2006.

Drawing of ADC Telecommunications Drawer, 2 pages, Nov. 2006.

FIG. 7
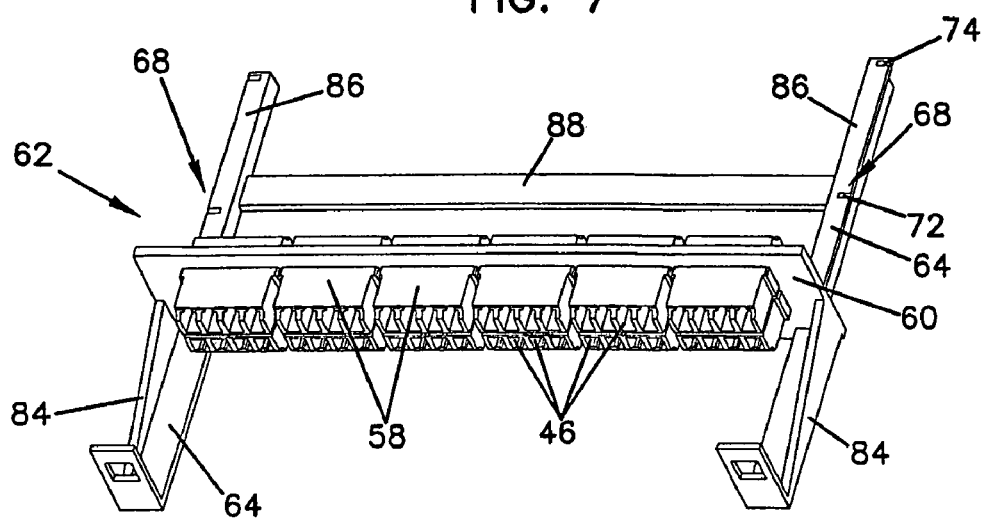
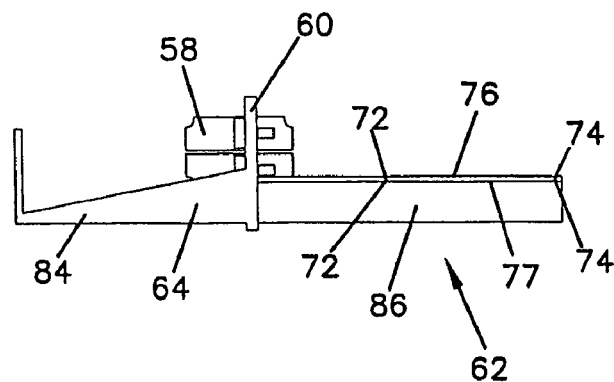
FIG. 8
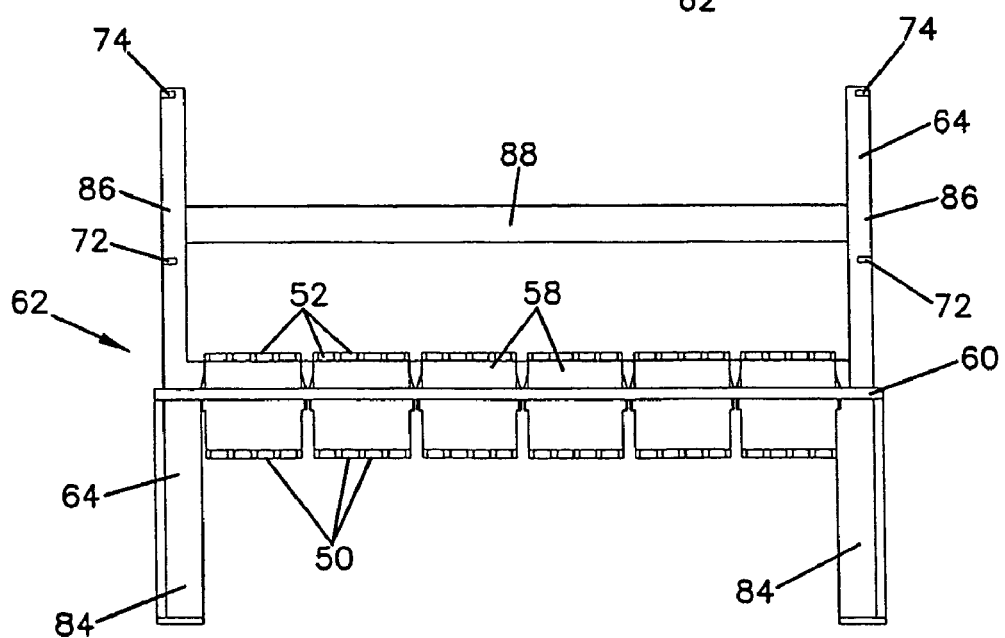
FIG. 9

ADAPTER PANEL WITH LATERAL SLIDING ADAPTER ARRAYS

CROSS-REFERENCE TO RELATED APPLICATIONS

This application is a continuation of U.S. application Ser. No. 11/715,258, filed Mar. 6, 2007 now U.S. Pat. No. 7,570,861; which is a continuation-in-part of U.S. application Ser. No. 11/655,760, filed Jan. 19, 2007 now U.S. Pat. No. 7,570,860; which applications are incorporated herein by reference.

FIELD OF THE INVENTION

This disclosure relates to devices for use in the telecommunications industry, and associated methods. More specifically, this disclosure relates to a termination panel for use in the telecommunications industry, and methods associated with termination panels.

BACKGROUND OF THE INVENTION

Many local area networks and telecommunication systems utilize termination panels to provide cross-connections between telecommunications equipment. Demand for greater telecommunication services has prompted the increase in circuit densities of termination panels. Notwithstanding the advances made in the art, there is a continuous need for further advances to improve upon high-density termination panels and associated methods. Improvements are needed, for example, to enhance termination access and cable management associated with installation, maintenance, repair, upgrade, and cross-connection procedures related to termination panels.

SUMMARY OF THE INVENTION

The present disclosure relates to an adapter panel arrangement including a chassis and a panel of adapters. The adapters define open rearward cable connections and open forward cable connections of the panel arrangement. The adapters are arranged in arrays that slide independently of other arrays to provide access to the open rearward and open forward cable connections. Access to the connections is further provided by removable access panels attached to the top wall of the chassis and bottom access openings formed in a sliding drawer. Access to the interior region of the chassis is provided by a removable rear chassis wall.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 7 is a top perspective view of one embodiment of a sliding frame piece and an adapter array of the adapter panel arrangement of FIG. 1, shown in isolation;

FIG. 8 is a side elevation view of the sliding frame piece and adapter array of FIG. 7;

FIG. 9 is a top plan view of the sliding frame piece and adapter array of FIG. 7;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
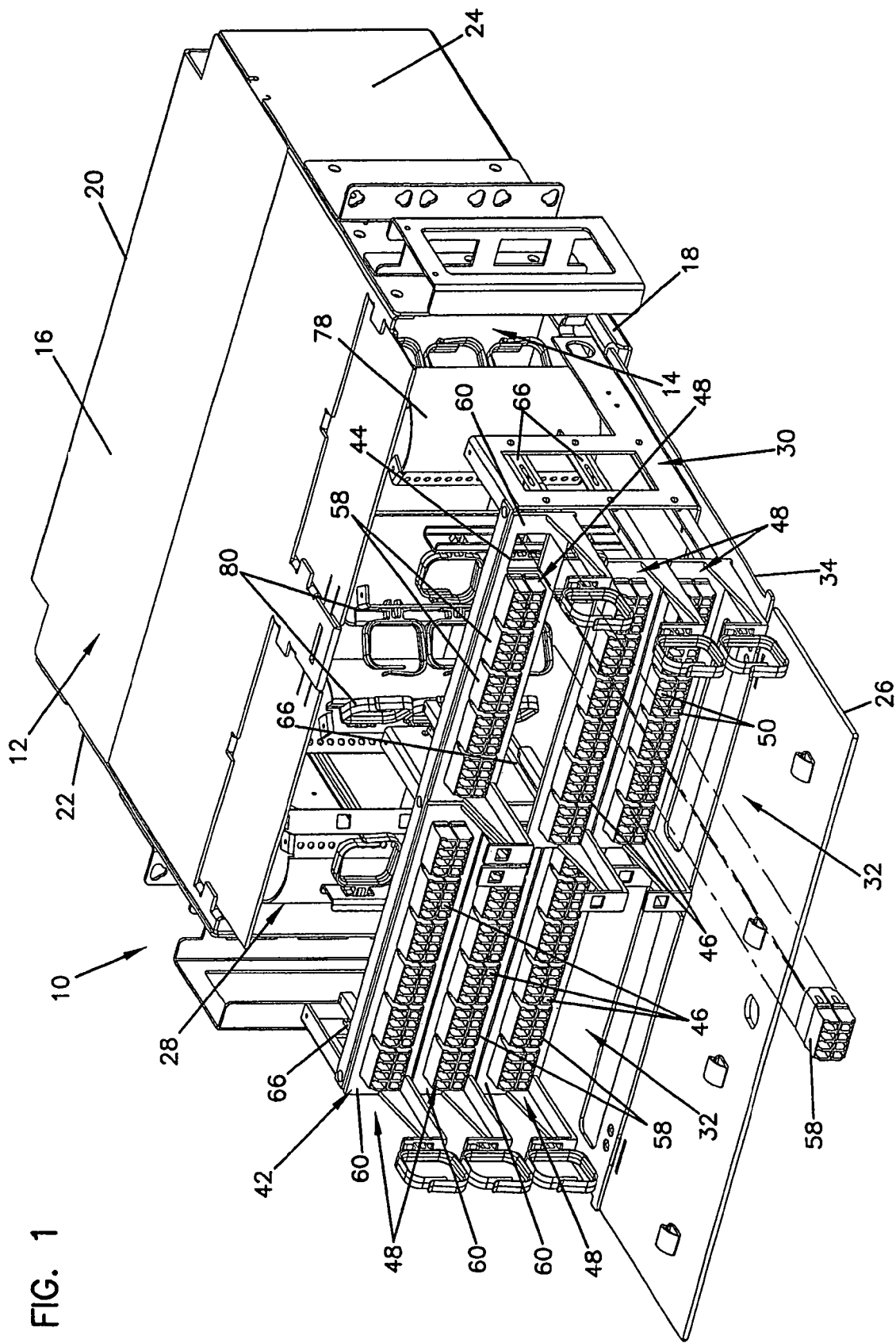
FIG. 1 is a front perspective view of one embodiment of an adapter panel arrangement, in accordance with the principles disclosed, shown with a drawer of the adapter panel arrangement in an open position.

FIG. 1 illustrates a distribution frame or adapter panel arrangement 10 in accordance with the principles disclosed. The adapter panel arrangement 10 is designed to provide a high density of cable terminations, yet facilitate access to the cable terminations from the rear during installation procedures, and from the front during post-installation procedures.

Figure 2:
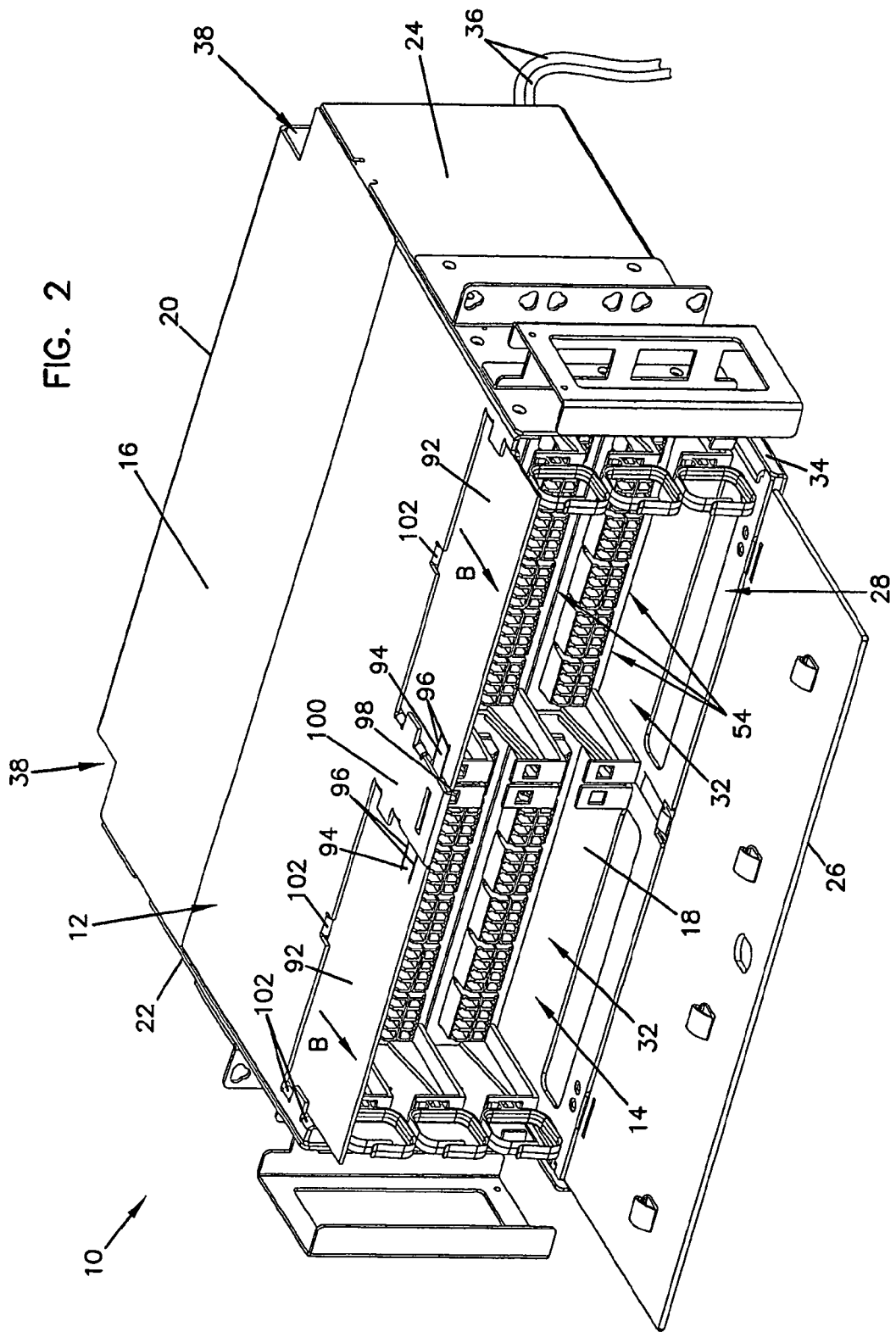
FIG. 2 is a front perspective view of the adapter panel arrangement of FIG. 1, shown with the drawer in a closed position.
Figure 3:
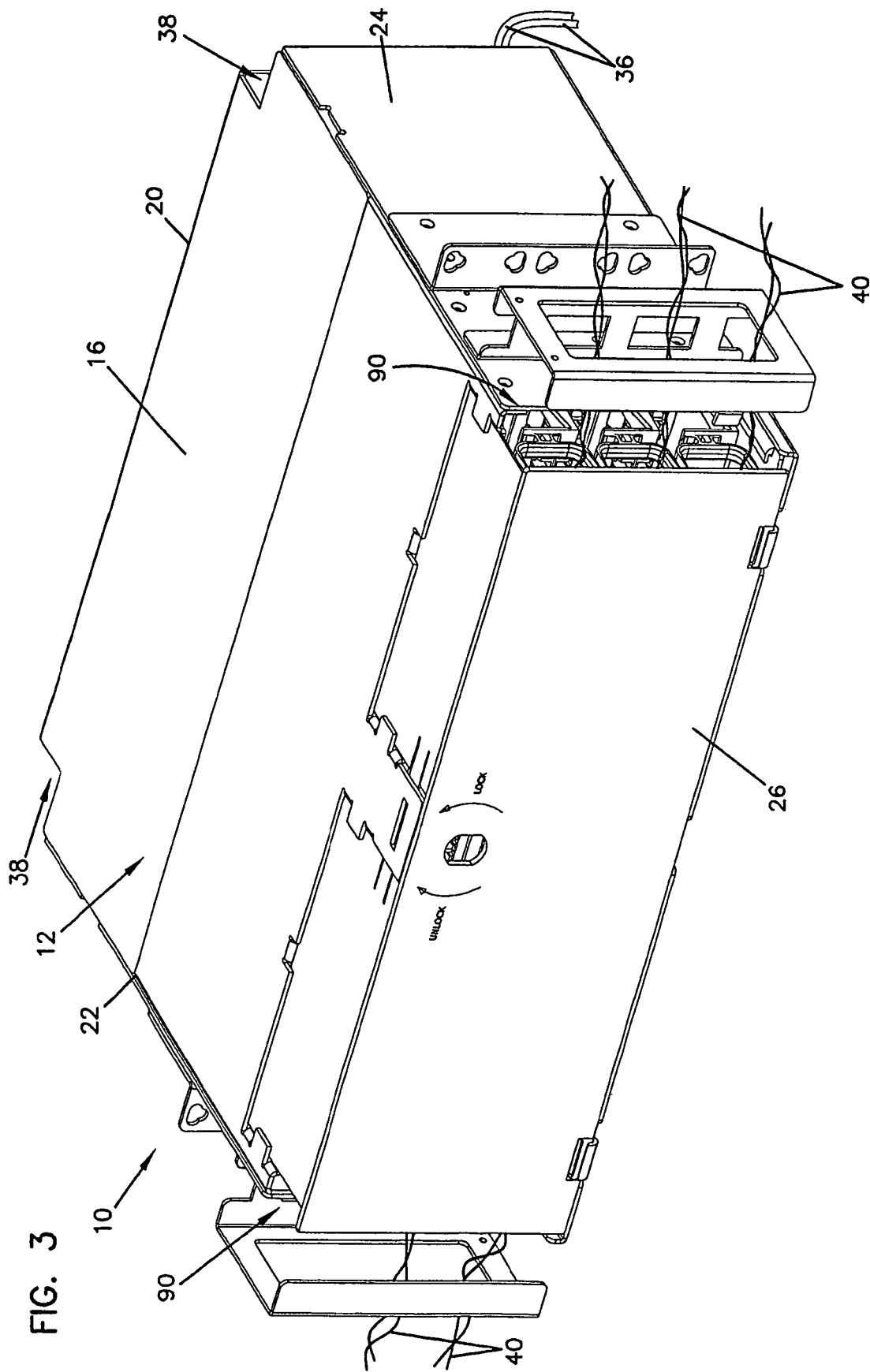
FIG. 3 is a front perspective view of the adapter panel arrangement of FIG. 2, shown with a cover of the arrangement closed.

The adapter panel arrangement 10 of the present disclosure generally includes a chassis 12 having an interior 14. The interior 14 is defined by a top wall 16, a bottom wall 18, a rear wall 20, and side walls 22, 24. The adapter panel arrangement 10 also includes a sliding drawer 34 that slides between an open position (FIG. 1) and a closed position (FIG. 2). A front cover 26 is attached to the sliding drawer 34. When the drawer 34 is in the closed position, the front cover 26 encloses the interior 14 of the chassis 12 when closed (FIG. 3) and provides access to the interior 14 when open (FIG. 2).

Referring now to FIGS. 1 and 2, the adapter panel arrangement 10 includes a framework structure 30 (FIG. 1) that is attached or mounted to the drawer 34. A panel of adapters 32 is mounted to the framework structure 30. As will be described in greater detail hereinafter, the drawer 34 is designed to slide outward from the chassis 12 primarily for installation purposes. That is, the drawer 34 can be slid to the open position during installation or assembly of the adapter panel arrangement, but is position in the closed position (FIG. 2) during operative use of the arrangement 10. During operative use, the framework structure 30 and the panel of adapters 32 are located within the interior 14 of the chassis 12 and the drawer 34 is in the closed position (FIG. 2). A user accesses the panel of adapters 32 from a front opening 28 of the chassis 12 without sliding the drawer 34 forward.

Referring again to FIG. 1, the panel of adapters 32 includes a face panel 42 that defines a number of openings 44 (only one shown). Adapters 46 are mounted within the openings 44. In the illustrated embodiment, the adapters are LC type adapters; however, other types of adapters, such as SC, ST, FC and MPO type adapters can also be used in accordance with the principles disclosed. Further, in the illustrated embodiment, the adapters 46 are blocked or grouped; each adapter block 58 including eight adapters 46 (four adapter pairs). Other number of adapters can be provided in an adapter block, such as four adapters (two adapter pairs), for example; the openings in the face panel 42 being correspondingly sized to receive the four-adapter blocks. Alternative, single adapters can be used and mounted with openings sized to receive the single adapters.

The openings 44 of the face panel 42 are arranged in rows; each row of mounted adapter blocks 58 defines an adapter array 48. What is meant by a row is that the openings 44 are arranged in a generally horizontal alignment, as opposed to being arranged in a column or in a vertical alignment; accordingly, the adapter arrays 48 are generally horizontal adapter arrays.

Figure 4:
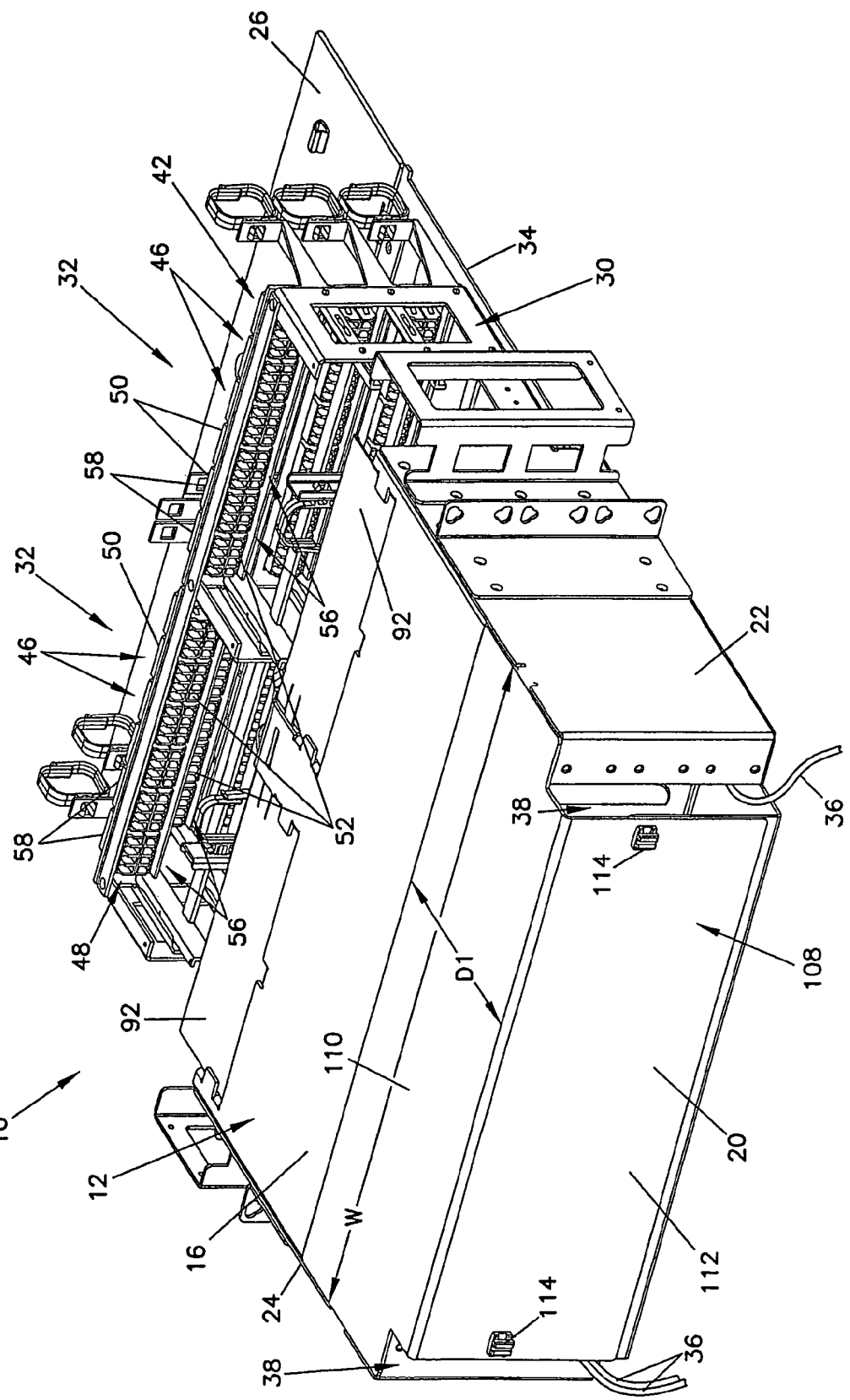
FIG. 4 is a rear perspective view of the adapter panel arrangement of FIG. 1.

Referring now to FIGS. 1 and 4, the adapters 46 of the adapter blocks 58 each includes a front connection end 50 (FIG. 1) and a rear connection end 52 (FIG. 4). When mounted within the openings 44, the front connection ends 50 of the adapters 46 are located toward the front opening 28 of the chassis 12, and the rear connection ends 52 of the adapters 46 are located toward the rear wall 20 of the chassis 12. The front connection ends 50 of the adapters 46 define open frontward cable connection locations 54 (FIG. 2) of the face panel 42. The rear connection ends 52 of the adapters 46 define open rearward cable connection locations 56 (FIG. 4) of the face panel 42.

What is meant by "open cable connection locations" are locations that are provided in an open region in the chassis 12, as opposed to a connection location that is enclosed within a housing or module, the housing or modules in turn being mounted within the chassis. That is, the panel of adapters 32 is a panel of unenclosed adapters 46 that are not enclosed relative to the other adapters 46 on the face panel 42. While the panel of adapters itself is enclosed within the chassis 12, the plurality of adapters 46, and each of the adapter arrays 48 are not enclosed separately from the other adapters 46 or the other adapter arrays 48.

Figure 5:
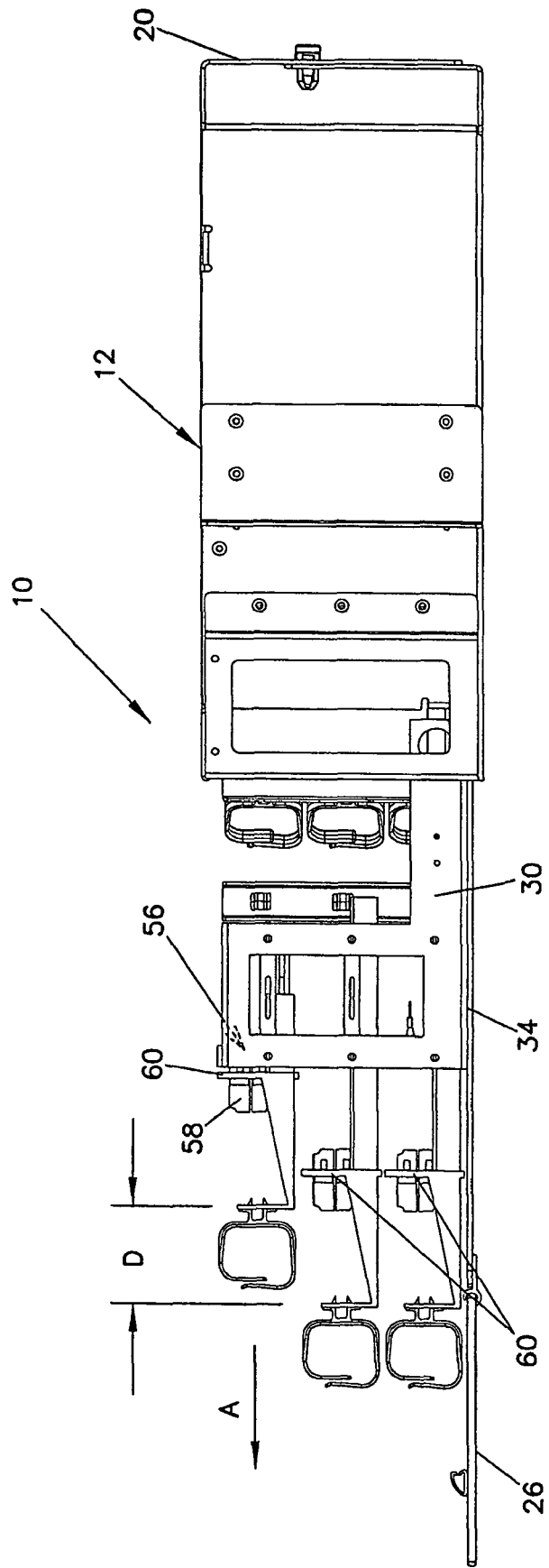
FIG. 5 is a side elevation view of the adapter panel arrangement of FIG. 4.
Figure 6:
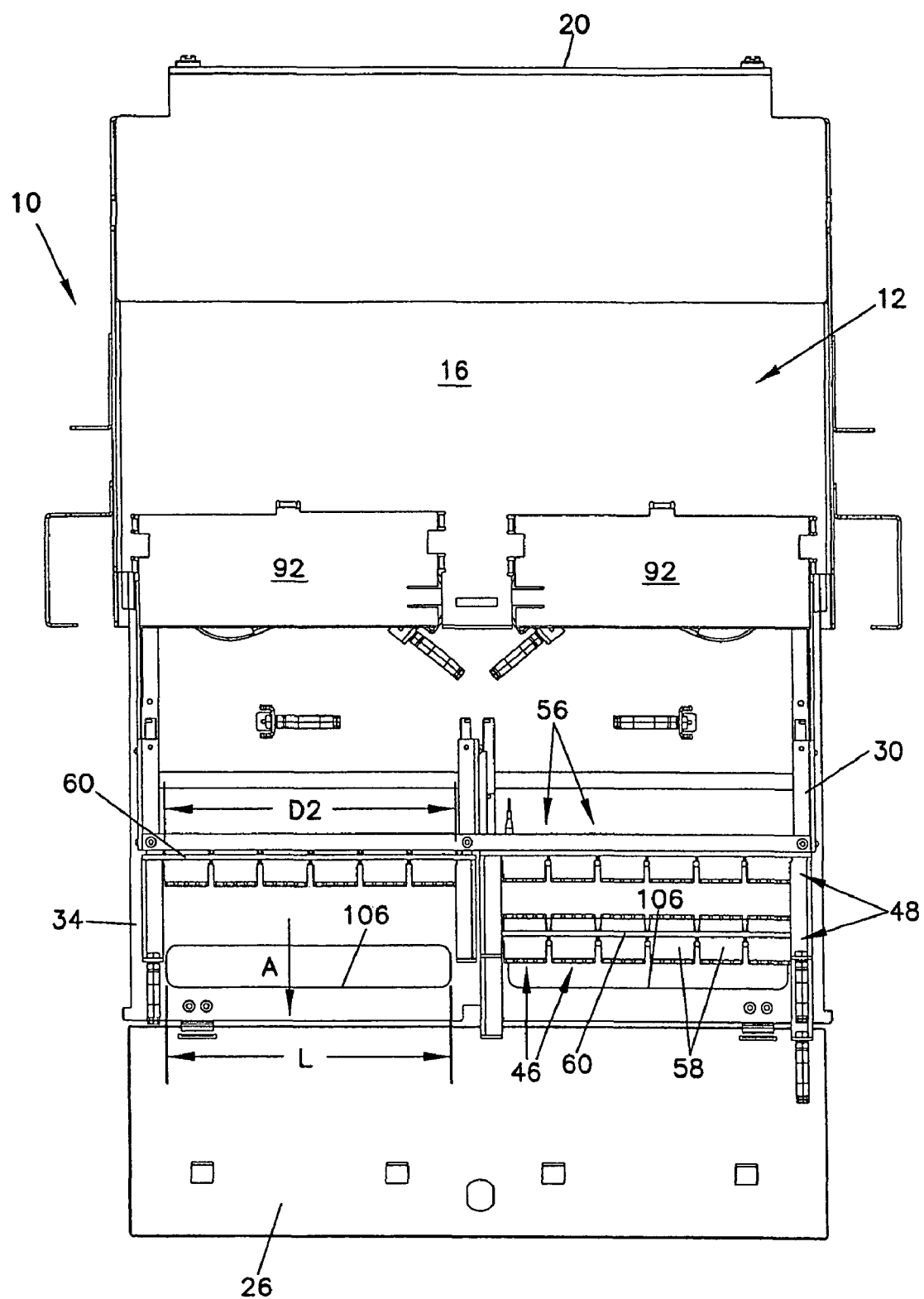
FIG. 6 is a top plan view of the adapter panel arrangement of FIG. 5.

Referring now to FIGS. 1, 5 and 6, the adapter arrays 48 of the face panel 42 are designed to slide in a lateral direction independent of other adapter arrays. In particular, the face panel 42 is defined by a number of separate panel sections 60. In the illustrated embodiment, each separate panel section defines one row of openings in which the blocks 58 of unenclosed adapters 46 are mounted, i.e., each panel section 60 contains one adapter array 48. In other embodiments, the panel sections can include, for example, two rows of openings that receive four-adapter blocks, for example; this panel section embodiment containing two adapter arrays.

The face panel 42 of the adapter panel arrangement 10 illustrated includes six panel sections 60—two panel sections 60 positioned side-by-side, and stacked three panel sections high (see FIG. 1). Each panel section 60 contains six blocks 58 having eight adapters 46 for a total of 288 frontward connection locations and rearward connection locations. Each separate panel section 60 is designed to selectively slide in a forward, lateral direction (A) independent of the other panel sections. The forward, lateral direction (A) is a direction extending between the front opening 28 and the rear wall 20, as opposed to a direction which is transverse to the bottom wall 18 of the chassis 12, for example.

Referring to FIGS. 7-9, each separate panel section 60 of the panel of adapters 32 is attached to a sliding frame piece 62. The sliding frame piece 62 includes a pair of elongated rail members 64. In the illustrated embodiment, the elongated rail members 64 include a forward rail portion 84 that extends forwardly from the panel section 60, and a rearward rail portion 86 that extends rearwardly from the panel section 60. The sliding frame piece 62 can include a cross-support 88 to maintain the structural relationship of the rail members 64.

Figure 10:
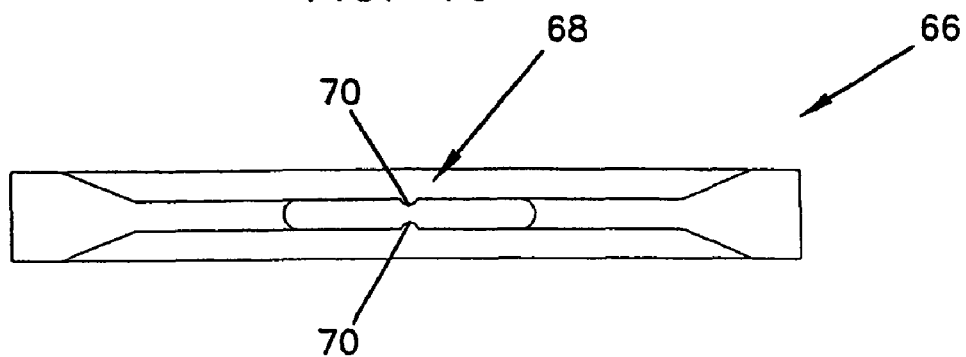
FIG. 10 is a side elevation view of one embodiment of a guide of the adapter panel arrangement of FIG. 1, shown in isolation.
Figure 11:
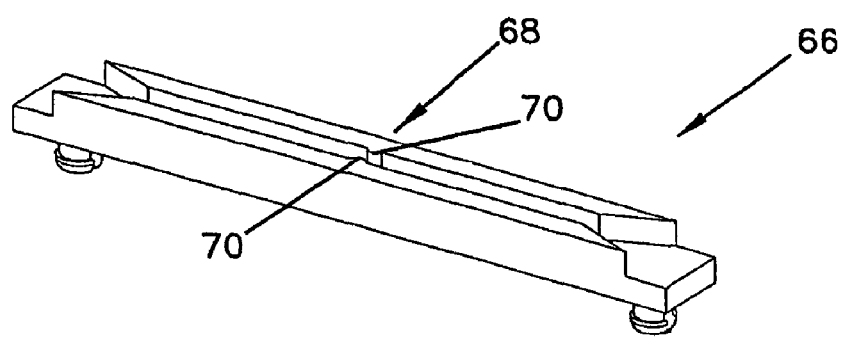
FIG. 11 is a bottom perspective view of the guide of FIG. 10.

The pairs of elongated rail members 64 are arranged to engage and slide within pairs of guides 66 (one shown in FIGS. 10-12) that are mounted to the framework structure 30 (FIG. 1) of the arrangement 10. The rail members 64 and the guides 66 include a stop arrangement 68 that limits the sliding motion of the panel sections 60 between a rearward position (see the top panel section 60 in FIG. 5) and a forward position (see the bottom panel section 60 in FIG. 5).

Referring to FIGS. 9-12, the stop arrangement 68 (FIG. 12) is defined by at least one projection 70 (FIGS. 10 and 11) located on each guide 66 of the pair of guides, and first and second pockets or detents 72, 74 (FIG. 9) formed in the rail members 64. In the illustrated embodiment, two projections 70 (upper and lower projections) are provided on each of the guides 66. Correspondingly, upper and lower detents 72, 74 (see FIG. 8) are formed in the rearward rail portions 86 of the rail members 64. While the illustrated embodiment depicts the detents 72, 74 formed in the rail members 64 and the projections 70 provided on the guides 66, it is contemplated that the detents can be formed in the guides 66 and the projection correspondingly provided on the rail members 64.

Figure 12:
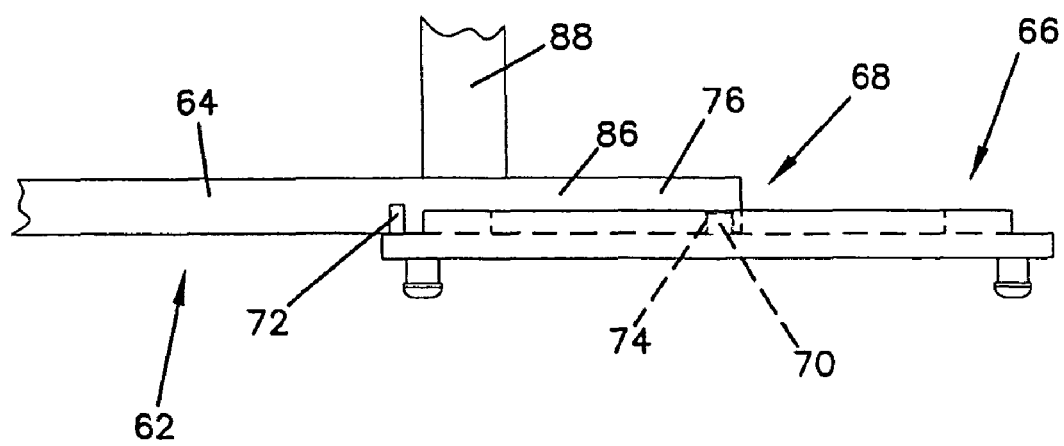
FIG. 12 is a top plan view of the guide of FIG. 10, and a portion of the sliding frame piece of FIG. 9.

Referring still to FIGS. 9-12, when the panel section 60 is positioned in the rearward position, the projections 70 of the guides 66 seat within the first detents 72 of the rail members 64 to retain the panel section 60 in the rearward position. The guides 66 are flexibly constructed so that when the panel section 60 is pulled forward, the projections 70 un-seat and slide along top and bottom surfaces 76, 77 (FIG. 8) of the rail members 64. Referring to FIG. 12, when the panel section 60 reaches the forward position, the projections 70 seat within the second detents 74 of the rail members 64. This stop arrangement 68 indicates to a user when the panel section 60 has reached the predetermined forward position, and similarly, the rearward position.

Referring back to FIG. 5, in general, the stop arrangement 68 provides an indication of when the panel section 60 has moved a lateral distance D forward from the rearward position to the forward position. In one embodiment, the lateral distance D is no more than about 4.0 inches forward from the rearward position. In the illustrated embodiment, the lateral distance D is about 1.7 inches. Providing such an indication to the user prevents the user from moving the panel section 60 a distance beyond that which cables interconnected to the panel section 60 will allow.

In particular, as previously described, the present panel arrangement 10 is designed such that the drawer 34 is intended to slide only during installation procedures, as opposed to post-installation or during operative use. Referring to FIG. 4, during installation, cables 36, such as fiber optic cables, are routed into the chassis 12 through rear openings 38 and terminated to the open rearward connection locations 56 of the face panel 42 (i.e., the rear connector ends 52 of the adapters 46).

The fiber optic cables 36 have a predetermined length that can be routed about cable storage spools or structures (see e.g., 78, 80 in FIG. 1). The predetermined lengths of the cables, however, do not have enough slack to accommodate drawer 34 movement during operative use, and the arrangement 10 does not have devices such as sliding radius limiters that take up or manage excessive movement of such cable slack.

In present panel arrangement 10, the predetermined lengths of the cables generally accommodate only the limited sliding movement of the panel sections 60. That is, while the drawer 34 may be slid out for purposes of installation, or for repairs requiring access to the region behind the panel of adapters 32, the drawer 34 is not intended to slide for purposes of accessing the panel of adapters 32 during operative use of the adapter panel arrangement 10. Operative use and access to the panel of adapters 32 is instead provided by the sliding movement of the panel sections 60 relative to the sliding movement of the drawer 34.

In general, the lateral sliding movement of the panel sections 60 provides access to the open cable connections (e.g., 54, 56) defined by the adapter arrays 48. Access to the open connection locations (e.g., 54, 56) of the face panel 42 is important in two primary instances: the first instance being during installation (e.g., during initial install or assembly, or during repair, replacement, or upgrade of the cable terminations at the rearward connection locations 56 of the panel 32); the second instance being after installation during operative use of the arrangement 10.

Referring back to FIGS. 1 and 4, during installation, the drawer 34 is pulled out to the open position. As previously described, a technician routes the fiber optic cables 36 through the rear openings 38 of the chassis 12 and terminates the cables to the open rearward connection locations 56 of the panel of adapters 32. To provide better access to the rear connection ends 52 of the adapters 46 defining the rearward connection locations 56, one of the adapter arrays 48 is positioned in the rearward position (e.g., the top array), while the remaining adapter arrays (e.g., the arrays located beneath the top array (see also FIGS. 5 and 6)) are positioned in the forward position. In this configuration, the technician has better access to the open rearward connection locations 56 of the one panel section 60 positioned in the rearward position. Once cable terminations to that particular adapter array 48 are complete, that adapter array can be slid forward and the next array to which cables are to be terminated slid rearward.

Referring to FIG. 4, to provide even further access to the open rearward connection locations 56, the top wall 16 of the chassis 12 includes removable access panels 92. Referring to FIG. 2, each of the panels 92 slides outward in a direction B from the top wall 16 of the chassis 12. In FIG. 2, the panels 92 are shown engaged with the top wall 16. In particular, each panel 92 is locked in place by a flexible tab 94 that engages a hem or roll 98 formed in a top wall portion 100 of the top wall 16. The flexible tab 94 is defined by slots 96 formed in the panel 92. The hem or roll 98 is formed by bending or rolling a section of the top wall 16 over on itself; although structure can be attached to the top wall as an alternative to providing a hem.

Figure 15:
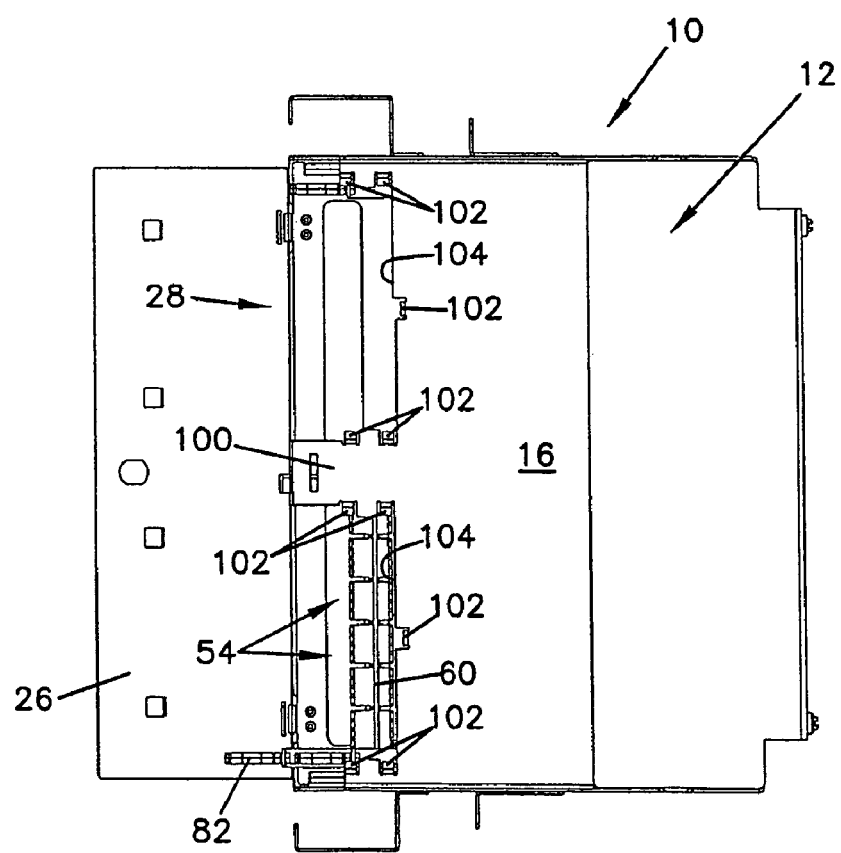
FIG. 15 is a top plan view of the adapter panel arrangement of FIG. 14.

To slide one of the panels 92 out, the flexible tab 94 is flexed downward beyond the hem or roll 98 formed in the top wall portion 100. The panel is then slid out in the direction shown in FIG. 2 and removed to define a top wall opening 104 (see e.g., FIG. 15) located adjacent to the front opening 28 of the chassis 12. The top wall opening 104 provides further access to the open rear connection locations 56. To re-attach the panel 92, the panel 92 is place in relation to the top wall opening 104, the flexible tab 94 is flexed downward, and the panel 92 is then slid back into place. As shown in FIG. 15, retaining flanges 102 are formed in the top wall 16 at the top wall openings 104. The retaining flanges 102 support the panels 92 when attached to the top wall 16 of the chassis 12.

The open rearward connection locations 56 are typically access only during installation procedures, with the exception of repairs or upgrades, for example. The open frontward connection locations 54, however, are accessed on a more regular basis to provide cross-connections between telecommunications equipment. Such use is referred to as operative use, or use that is post-installation and primarily involves maintaining or establishing cable terminations at the front connection ends 50 of the adapters 46.

Figure 13:
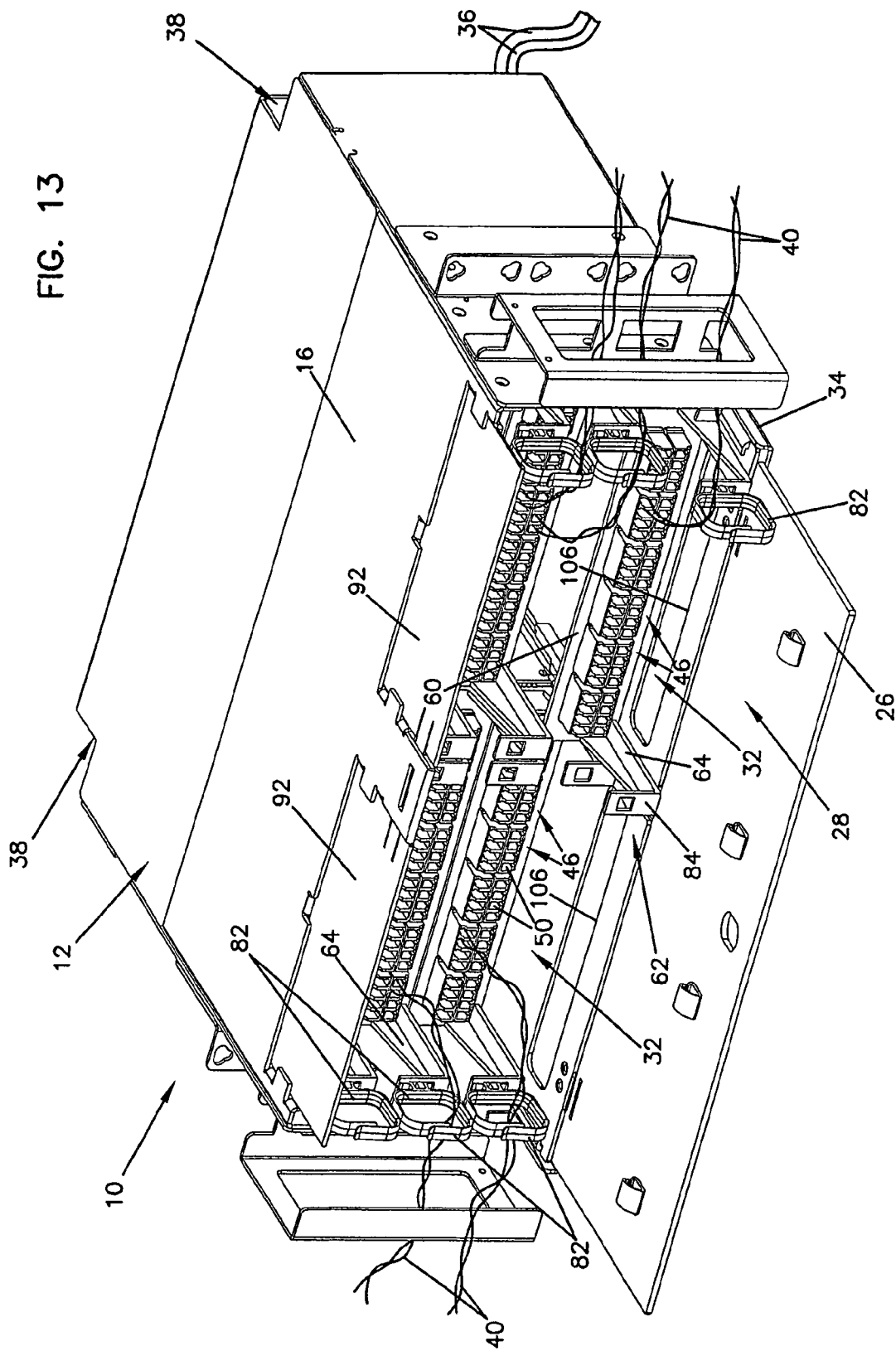
FIG. 13 is a front perspective view of the adapter panel arrangement of FIG. 2, shown with an adapter array positioned in a forward position.
Figure 14:
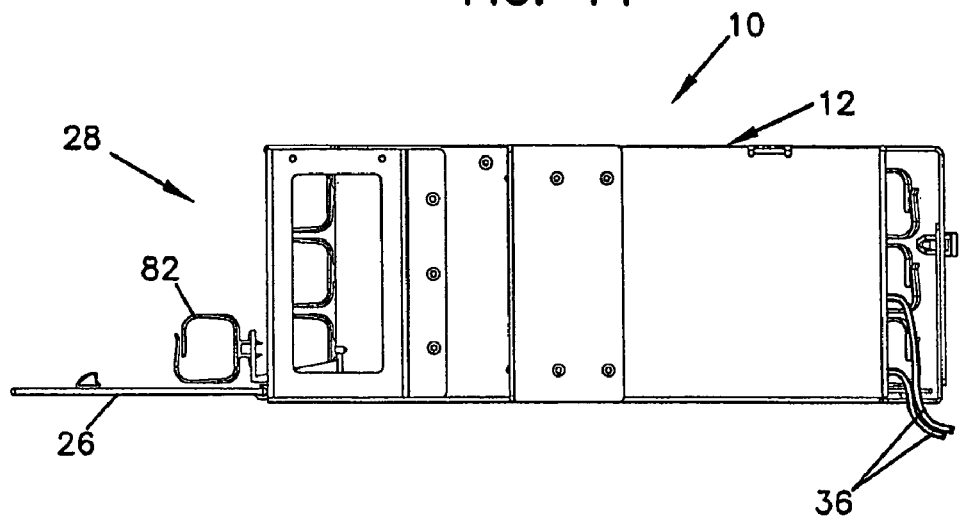
FIG. 14 is a side elevation view of the adapter panel arrangement of FIG. 13.

Referring now to FIGS. 13-15, the adapter panel arrangement 10 is shown in operative use. During operative use, the panel of adapters 32 is accessed through the front opening 28 of the chassis 12, with the drawer 34 positioned in the closed position.

As previously described, the cables 36 that enter the interior 14 of the chassis 12 through rear openings 38 are terminated to the open rear connection locations 56 of the panel of adapters 32. Referring to FIG. 13, jumper cables or patching cables 40 are also terminated to the panel of adapters 32; and in particular, to the open frontward connection locations 54 of the panel 32. The patching cables 40 provide the cross-connections between the adapter panel arrangement 10 and other telecommunications equipment (not shown). The patching cables 40 are routed from the front opening 28 and through side openings 90 (FIG. 3) of the chassis 12 to cable routing structure (e.g., channels, not shown) of the telecommunications system.

Because of the high-density arrangement of the adapters 46, each panel section 60 of the panel of adapters 32 slides forward to separate the associated adapter array 48 from the other arrays. By separately positioning the panel section 60 and the associated adapter array 48 forward, a technician can more easily grasp a particular connector of a patching cable 40, and/or more easily terminate a patching cable to a particular adapter 46 of the forwardly-positioned array. In addition, and as previously described, the access panels 92 (FIG. 13) of the top wall 16 can be removed (as shown in FIG. 15) to provide even further access to the open frontward connection locations 54 of the panel sections.

Referring again to FIG. 13, the forward rail portion 84 of the rail member 64 can be used as a handle to pull the panel section 60 forward. Alternatively, the user can slide the panel section 60 forward by grasping a retaining ring 82 attached to the rail member 64 of the sliding frame piece 62. In the illustrated embodiment, the retaining rings 82 are attached to the ends of outer rail members 64 of the sliding frame piece 62 to protect the patching cables 40 from exceeding a minimum bend radius.

Referring still to FIG. 13, additional access to the adapters 46 is provided through cut-outs or bottom access openings 106 located adjacent to the front opening 28 of the chassis. The bottom access openings 106 are formed in the drawer 34 of the chassis 12. As can be understood, the front connection end 50 of the adapters 46 on the lower-most panel section 60 can be difficult to access as finger space between the lower-most adapters and the drawer 34 is limited. To better access to those particular adapters during operative use, a technician simply slides the lower-most panel section 60 outward relative to the drawer 34 such the that lower-most panel section 60 is adjacent the cut-out or opening 106. The opening 106 provides additional finger space equal to the thickness of the drawer. In the illustrated embodiment, the addition finger space is approximately ¼ of an inch.

The bottom access openings 106 also provide better access to the lower-most adapters during installation or repair procedures. Referring to FIGS. 5 and 6, during an install, for example, a technician can slide the drawer 34 outward using the bottom access openings 106 as handles, slide the lower-most panel 60 outward adjacent to the bottom access opening 106 (FIG. 6), and then reach through the bottom access opening 106, from beneath the drawer 34, to access the front connection ends of the adapters on the lower-most panel. Referring to FIG. 6, in the illustrated embodiment, the bottom access openings 106 have a length L. Preferably, the length L spans a substantial majority of the distance D2 of which the plurality of adapters 46 span.

Referring back to FIG. 4, the present chassis 12 is also configured to provide access to the interior 14 of the chassis through the rear. In particular, the rear of the chassis 12 is partly defined by a removable rear chassis portion 108 that provides access to the chassis interior 14 when initially installing cables, for example. In the illustrated embodiment, the removable rear chassis portion 108 is a two-part chassis portion. A first part 110 of the removable rear chassis portion 108 partly defines the top wall 16 of the chassis, and a second part 112 defines the rear wall 20.

The rear chassis portion 108 is detachably secured to the remainder of the chassis 12 by latches 114. To access the interior 14 of the chassis 12, the rear chassis portion 108 is unlatched and removed. The first part 110 of the rear chassis portion 108 has a depth D1 that exposes the interior to provide access to interior cable routing areas. In the illustrated embodiment, the depth D of the part 110 of the chassis portion provides an exposed opening in the top wall that is at least about 5 inches. The exposed opening also extends the width W of the chassis (i.e., extends from one side wall 22 of the chassis to the other side wall 24). The exposed opening through the top wall 16, in addition to the removal of the rear wall 20 aids in routing cables within the interior of the chassis 12.

While the present disclosure is described with respect to use in a fiber optic application, the disclosed panel arrangement can be adapted for use in other applications. For example, in some applications, copper cables may be used exclusively from fiber optic cables; and accordingly various types of wire terminations or wire connectors can be provided on the face panel of the arrangement. Still, in other applications having hybrid cabling, or applications having both types of fiber optic and copper cabling, the face panel of the arrangement can be provided with a combination of fiber optic and copper connectors and/or adapters.

In general, the present adapter panel arrangement 10 provides a high-density adapter panel arrangement while facilitating access to otherwise crowded front and rear connection locations. Because of the access design of the present arrangement, the amount of space utilized on racks and cabinets is minimized; or, in the alternative, allows for expansion and upgrade of systems having spatial constraints, as more densely packed connection locations are provided without sacrificing effective access to the connection locations.

The above specification provides a complete description of the present invention. Since many embodiments of the invention can be made without departing from the spirit and scope of the invention, certain aspects of the invention reside in the claims hereinafter appended.

What is claimed is:

1. A chassis arrangement, comprising:
   a) a chassis assembly including housing, a drawer that slides relative to the housing, and framework structure mounted to the drawer;
   b) sliding adapter arrays carried by the framework structure, the sliding adapter arrays defining front connection locations, the sliding adapter arrays being arranged in rows, the sliding adapter arrays being constructed to slide between a rearward position and a forward position independent of the drawer and independent of one another; and
   c) a bottom access opening formed in the chassis assembly, the bottom access opening providing access therethrough to the front connection locations of the sliding adapter arrays when the adapter arrays are in the forward position.

2. The arrangement of claim 1, wherein the front connection locations are front open connection locations.

3. The arrangement of claim 1, wherein the bottom access opening is an elongated opening.

4. The arrangement of claim 1, further including a plurality of bottom access openings formed in the chassis assembly, the bottom access openings being aligned to extend a length that spans a substantial majority of a distance of which the front connection locations span.

5. The arrangement of claim 1, wherein the bottom access opening is formed in the drawer of the chassis assembly.

6. The arrangement of claim 5, wherein the bottom access opening provides access to at least some of the front connection locations of the adapter arrays by permitting a technician to reach through the bottom opening when the drawer is positioned in an open position relative to the housing.

7. The arrangement of claim 1, further including a top access opening formed in the housing, the top access opening being located adjacent to a front opening of the housing to provide access to the sliding adapter arrays.

8. The arrangement of claim 7, wherein the top access opening is provided by removing a panel attached to the top wall of the housing.

9. A chassis arrangement, comprising:
   a) a chassis assembly including a housing, a drawer that slides relative to the housing, and framework structure mounted to the drawer;
   b) adapters mounted to the framework structure; and
   c) a bottom access opening formed in the chassis assembly, the bottom access opening being located to provide access to front connection locations of the adapters;
   d) wherein the bottom access opening is elongated, the elongated bottom access opening extending a length that spans a substantial majority of the distance of which the adapters span.

10. The arrangement of claim 9, wherein the adapters are arranged in horizontal adapter arrays, and wherein the adapter arrays slide in a lateral direction toward a front opening of the housing to provide access to the front connection locations of the adapters.

11. The arrangement of claim 9, wherein the front connection locations are front open connection locations.

12. The arrangement of claim 9, further including a plurality of elongated bottom access openings formed in the chassis assembly, the elongated bottom access openings being aligned to extend a length that spans a substantial majority of a distance of which the adapters span.

13. The arrangement of claim 9, wherein the bottom access opening is formed in the drawer of the chassis assembly.

14. The arrangement of claim 13, wherein the bottom access opening provides access to at least some of the front connection locations of the adapters by permitting a technician to reach through the bottom opening when the drawer is positioned in an open position relative to the housing.

15. A chassis arrangement, comprising:
a) a chassis housing having an interior, the chassis housing including a removable rear chassis portion, the removable rear chassis portion including:
   i) a first part that partially defines a top chassis wall of the chassis housing;
   ii) a second part that defines a rear chassis wall of the chassis housing; and
   iii) a latch that detachably secures the rear chassis portion to a remainder of the chassis housing;
b) wherein the first part of the rear chassis portion provides an exposed opening in the top chassis wall when the rear chassis portion is removed, the exposed opening extending the width of the chassis housing.

16. The chassis arrangement of claim 15, wherein the chassis housing further defines rear chassis openings located adjacent to the rear chassis wall of the removable rear chassis portion, the rear chassis openings providing for cable passage through sides of the chassis housing.

17. The chassis arrangement of claim 16, wherein the rear chassis openings are notches formed in the sides and the rear wall of the chassis housing.

18. The chassis arrangement of claim 15, wherein the exposed opening provided in the top chassis wall has a depth of at least about 5 inches.

19. The chassis arrangement of claim 15, wherein the removable rear chassis portion includes two latches that detachably secure the rear chassis portion to the remainder of the chassis housing.

* * * * *